United States Patent [19]
Mallabone

[11] Patent Number: 5,897,776
[45] Date of Patent: Apr. 27, 1999

[54] FILTER MEDIA CONFIGURATION

[75] Inventor: Michael R. Mallabone, Gastonia, N.C.

[73] Assignee: Dana Corporation, Toledo, Ohio

[21] Appl. No.: 08/943,694

[22] Filed: Oct. 3, 1997

[51] Int. Cl.$^6$ .............................. B01P 27/06; B01P 46/52
[52] U.S. Cl. ................ 210/493 S; 210/495; 210/497.01; 55/511
[58] Field of Search ............................... 55/511; 210/495, 210/435, 497.2, 497.01, 451, 493.1, 493.5

[56] References Cited

U.S. PATENT DOCUMENTS

| | | |
|---|---|---|
| 2,205,706 | 6/1940 | Wolff . |
| 3,021,776 | 2/1962 | Kennedy . |
| 3,022,862 | 2/1962 | Harms . |
| 3,251,177 | 5/1966 | Baker . |
| 3,938,973 | 2/1976 | Kershaw . |
| 4,422,861 | 12/1983 | Dusza . |
| 5,178,760 | 1/1993 | Solberg, Jr. . |
| 5,222,488 | 6/1993 | Forsgren . |
| 5,632,793 | 5/1997 | Haggard . |

*Primary Examiner*—David A. Reifsnyder
*Attorney, Agent, or Firm*—Millen, White, Zelano & Branigan, P.C.

[57] ABSTRACT

An air filter has a filter media with a central portion and a boundary portion, the central portion having a greater density of filter area than the boundary portion. In one embodiment, this is accomplish by having more pleats in the central portion than the boundary portion and, in another embodiment, this is accomplished by having higher pleat amplitudes in the central portion than in the boundary portion.

19 Claims, 2 Drawing Sheets

FILTER MEDIA CONFIGURATION

FIELD OF THE INVENTION

The present invention relates to a configuration for filter media, and more particularly the present invention relates to a configuration for enhancing filter media efficiency, while decreasing initial restriction in air filters.

BACKGROUND OF THE INVENTION

In order to prolong the life of internal combustion engines, air filters are almost universally used to remove particulates from inlet air streams. The particulates build up on the upstream or dirty side of filter media employed by the air filter. This build up is not uniform and, according to current theory, after particulate build up in the center section of the filter, the velocity profile across the filter is redistributed so as to provide a flatter, generally consistent profile. However, it has been found that this is not the case and even at 150% of filter life, the velocity profile across the filter face is still largely of an inverse parabolic shape. It has also been found that if the filter is rectangular, the profile is more pronounced along the longer axis of the filter. To date, filter media has not been configured to address the actual velocity profile so as to increase filter capacity and efficiency and to decrease at least initial restriction.

SUMMARY OF THE INVENTION

In view of the aforementioned considerations, it is a feature of the present invention to provide a new and improved filter element with a new and improved filter media which compensates for the phenomenon of unequal loading of particulate matter across the upstream face of the filter.

In view of this feature and other features, the present invention is directed to a filter media having a central area and a boundary area, wherein the filter media area per unit front face area is greater at the central area than at the boundary area.

In another aspect, the present invention is directed to a panel filter for filtering a fluid, wherein the panel filter comprises a frame defining a filter face area through which the fluid passes in a composite direction normal to the filter face area. A pleated filter media having a central portion and a boundary portion is mounted within the frame with the boundary portion being adjacent the frame and extending to the central portion. The pleated filter media has a greater amount of filter surface area per unit of face area at the center portion than at the boundary portions.

In accordance with one embodiment of the invention, the greater amount of filter surface per unit of face area is due to pleat frequency at the center portion being greater than pleat frequency at the boundary portion and, in accordance with another embodiment of the invention, the greater density of filter surface per unit of face area is due to the pleat amplitude being greater at the central portion than at the boundary portion.

In still another aspect of the invention, the central portion is dome shaped, with the filter being circular.

In an additional aspect of the invention, the filter face area is rectangular and the boundary portion is comprised of a pair of portions on opposite sides of the central portion.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
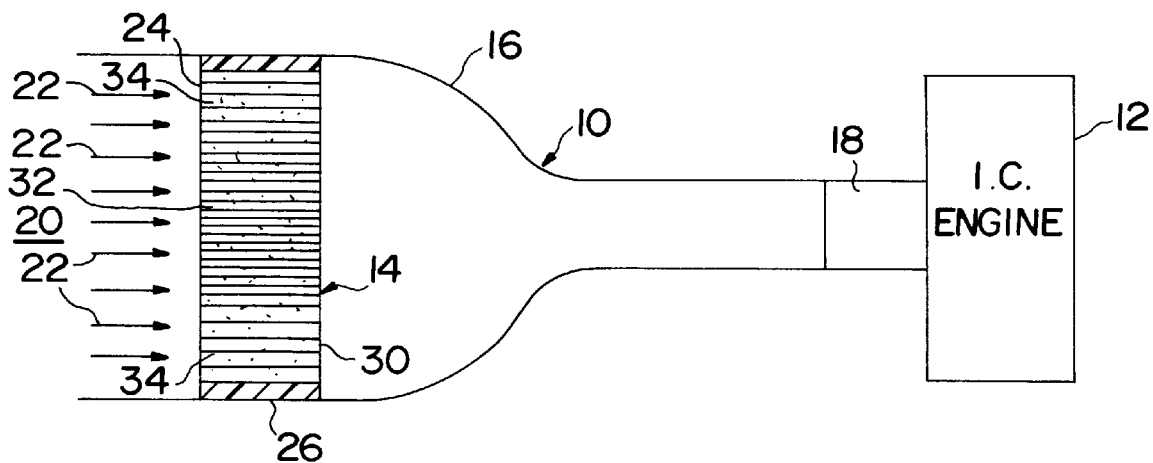
FIG. 1 is a top elevation illustrating an air filter element in accordance with the present invention positioned in an air filter housing for filtering inlet air for an internal combustion engine.
Figure 2:
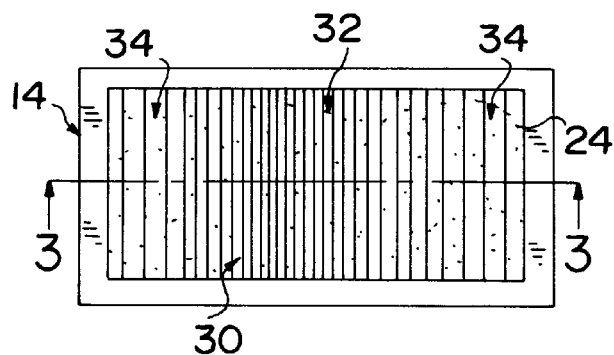
FIG. 2 is a planar front view of the panel air filter of FIG. 1.

Referring now to FIG. 1, there is shown an air intake system 10 for an internal combustion engine 12 in which a panel filter 14, configured in accordance with the principles of the present invention, is mounted in a housing 16. The housing 16 is connected to the engine 12 by an intake conduit 18.

Air enters the housing 16 through an inlet 20 in the composite direction illustrated by arrows 22 which are perpendicular to the front face area 24 of the filter 14. The front face area 24 is a flat plane is defined by a peripheral frame 26 of the filter 14 which retains a filter media 30 therein and seals with the inner wall of the housing 16.

In accordance with a preferred embodiment of the invention, the filter media 30 is a pleated filter media preferably configured of a cellulose material such as paper. While paper is preferred, other filter media material such as spun polyester on a suitable support may be employed.

It has been found that there is an uneven distribution of particulate matter across the front of the filter media 30 with considerably more particulate matter deposited at a central portion 32 of the filter media than at boundary portions 34 located adjacent the frame 26. In order to improve the capacity and efficiency of the filter 30, the filter media is configured with more filter media area disposed at the central portion 32 of the filter media 30 than at the boundary portions 34.

Figure 3:
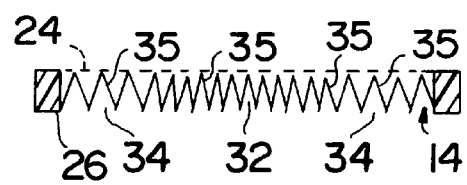
FIG. 3 is an elevation taken along lines 3—3 of FIG. 2.

In accordance with one embodiment of the invention, as is illustrated in FIG. 3, providing more filter area at central portion 32 is accomplished by increasing the number of pleats 35 per unit area of the front face 24, the total surface area of filter media 30 at the central portion 32 is greater than the total surface area of the filter media at the boundary areas 34. This is because there is more filter media material at the central portion 32.

Figure 4:
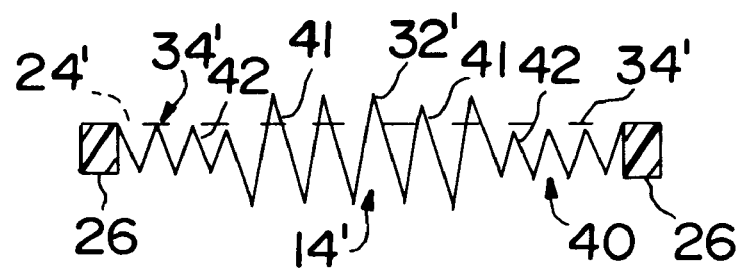
FIG. 4 is a side elevation of a second embodiment of the invention illustrating a filter media having higher pinks at a central portion than at boundary portions.

Referring now to FIG. 4, there is shown a second embodiment of the invention, wherein a pleated filter media 40 has pleats 41 of a larger amplitude at the central portion 32' than the pleats 42 at the boundary portions 34'. Consequently, since there is more filter media material 40 at the central portion, there is more surface area at the central portion 32'. Since there is more surface area at the central portion 32', there is a greater density of filter surface area per unit of face area 24' at the center portion 32', than at the boundary portions 34'.

Figure 5:
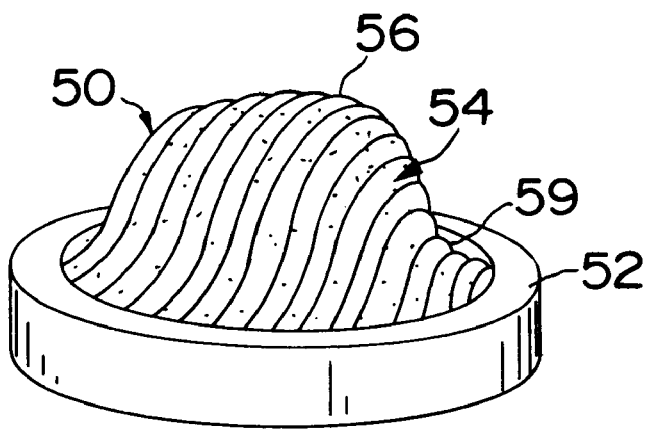
FIG. 5 is a perspective view of a circular dome shaped filter.
Figure 6:
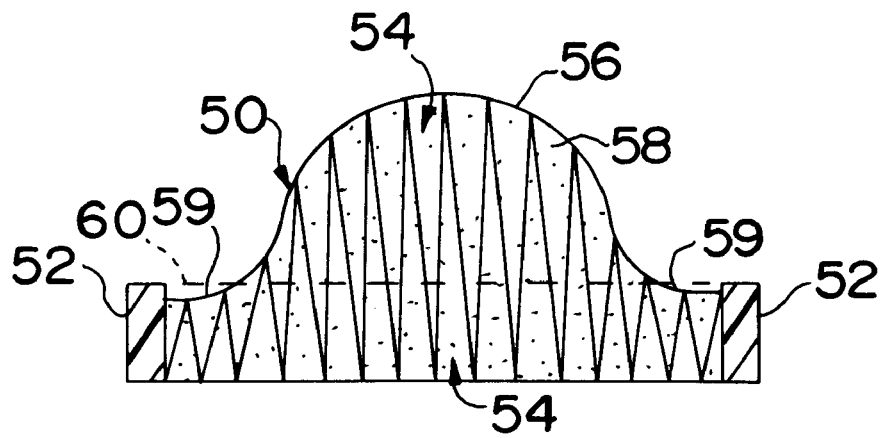
FIG. 6 is an elevation taken along lines 6—6 of FIG. 5.

Referring now to FIGS. 5 and 6, there is shown a third embodiment of the invention, wherein a filter element 50 has a circular configuration. The filter element 50 has a circular rim or frame 52 and encloses a filter media 54 having a circular periphery. The filter media 54 is dome shaped with a domed portion 56 comprised of filter media pleats 58 of a greater amplitude than filter media pleats 57 at an annular boundary portion 59. Again, by having a central portion with more filter media area than peripheral portions, the dome 56 results in a pleated filter media 50 having a greater density of filter surface per unit of face area 60 at the center portion of the filter 50 than at boundary portions 59.

By reducing the surface area at the boundary portions 34, 31' and 59 of the filter elements 14, 40 and 50, the velocity profile is flattened and the capacity and efficiency of the filter elements 14, 14' and 50 are increased. Moreover, there is a decrease in initial restriction. Accordingly, more filter media area can be added to the center areas of these filter elements without surpassing the original restriction.

The illustrated filter media is shown as a single pleated web; however, a configuration of a filter media with a tighter and/or thicker media at the central portion 32 which captures the majority of the particulates so as to further flatten the velocity profile is within the scope of this invention.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A filter media for filtering a fluid, wherein the fluid impacts the media over a face defined as a plane extending perpendicular to the direction of impact and the fluid emerges from the filter media into a substantially unobstructed space;

wherein the filter media comprises a central portion and a boundary portion;

wherein the filter media has a greater surface area per unit face area at the central portion than at the boundary portion; and wherein the filter media is a pleated filter media having parallel pleats.

2. The filter media of claim 1, wherein the central portion has more pleats per unit face area than the boundary portion.

3. The filter media of claim 1, wherein the pleats in the central portion have a greater amplitude than the pleats of the boundary portion.

4. The filter media of claim 1, wherein the filter media is made of a cellulose material or synthetic material such as spun polyester.

5. The filter media of claim 1, wherein the filter media is rectangular in shape and wherein the front face area is rectangular.

6. The filter media of claim 5, wherein the boundary portion occurs on two sides of the central portion.

7. The filter media of claim 1, wherein the pleated filter media has a density distribution with the greatest density of pleats at the center of the central portion, the density of pleats decreasing toward the boundary portion.

8. The filter media of claim 7, wherein the distribution is a parabolic distribution.

9. The filter media of claim 8, wherein the filter media is rectangular.

10. The filter media of claim 8, wherein the filter media is circular.

11. The filter media of claim 1, wherein the filter media is for filtering air.

12. A panel air filter comprising:

a frame defining a filter face area through which the fluid passes in a composite direction normal to the filter face area and emerges into an unobstructed space;

a pleated filter media of parallel pleats having a central portion and a boundary portion, the boundary portion being adjacent the frame and extending to the central portion, the pleated filter media having a greater amount of filter surface area per unit of face area at the central portion than at the boundary portion.

13. The panel air filter of claim 12, wherein the greater amount of filter surface per unit of face area is due to the pleat frequency at the center portion being greater than the pleat frequency at the boundary portion.

14. The panel air filter of claim 12, wherein the greater amount of filter surface per unit of face area is due to the pleat amplitude being greater at the center portion than at the boundary portion.

15. The panel air filter of claim 14, wherein the central portion is dome shaped.

16. The panel air filter of claim 12, wherein the filter face area is rectangular and the boundary portion is comprised of a pair of portions on opposite sides of the central portion.

17. The panel air filter of claim 16, wherein the greater density of filter surface per unit of face area is due to the pleat frequency at the center portion being greater than the pleat frequency at the boundary portion.

18. The panel air filter of claim 16, wherein the greater density of filter surface per unit of face area is due to the pleat amplitude being grater at the center portion than at the boundary portion.

19. The panel air filter of claim 12, wherein the pleated filter media is made of a cellulose material.

* * * * *